United States Patent [19]
Keiper, Jr.

[11] Patent Number: 4,468,787
[45] Date of Patent: Aug. 28, 1984

[54] TERNARY DATA TRANSMISSION SYSTEM

[75] Inventor: Francis P. Keiper, Jr., Sunnyvale, Calif.

[73] Assignee: Lear Siegler, Inc., Santa Monica, Calif.

[21] Appl. No.: 319,632

[22] Filed: Nov. 9, 1981

[51] Int. Cl.$^3$ ............................................. H04L 25/49
[52] U.S. Cl. ............................ 375/17; 340/347 DD; 375/96
[58] Field of Search ................... 328/41, 44, 162, 164; 178/690; 360/40, 45; 371/48, 52, 56; 375/17, 18, 20, 76, 98; 340/347 DD

[56] References Cited

U.S. PATENT DOCUMENTS

| | | | |
|---|---|---|---|
| 3,609,755 | 9/1971 | Fenyves | 340/347 DD |
| 4,081,756 | 3/1978 | Price et al. | 360/45 |
| 4,086,566 | 4/1978 | Lender | 371/56 |
| 4,097,687 | 6/1978 | Yamaguchi | 375/18 |
| 4,123,625 | 10/1978 | Chow | 375/18 |
| 4,271,526 | 6/1981 | Flora | 375/17 |

OTHER PUBLICATIONS

Quantized Feedback in an Experimental 280-Mb/s Digital Repeater for Coaxial Transmission by F. D. Waldhauer, IEE Transactions on Communications, Jan. 1974, pp. 1-5.

T1D System Overview by J. B. Singleton and J. A. Lombardi, 1980.

Primary Examiner—Benedict V. Safourek
Attorney, Agent, or Firm—Christie, Parker & Hale

[57] ABSTRACT

A source of a duobinary data signal is connected to a remote point by a coupling network having a high pass characteristic and transmission line. The data signal received at the remote point is subtracted from a delayed version thereof to derive the change representative signal, which is utilized at the remote point to regenerate and/or detect code violations of the data signal. Preferably, the received data signal is subtracted from a version thereof delayed by one bit time period. Circuitry generates an indication of a violation when, after assuming one extreme level in a given bit time period, the change representative signal again assumes the same level before assuming the other extreme level during a bit time period separated by an odd number of bit time periods from the given bit time period. Circuitry may also convert the change representative signal back to the duobinary data signal. Specifically, a three-state reversible binary counter is stepped up one state each time the change representative signal assumes its high level, is stepped down one state each time the change representative signal assumes its low level, and remains unchanged in state each time the change representative signal assumes its intermediate level.

16 Claims, 5 Drawing Figures

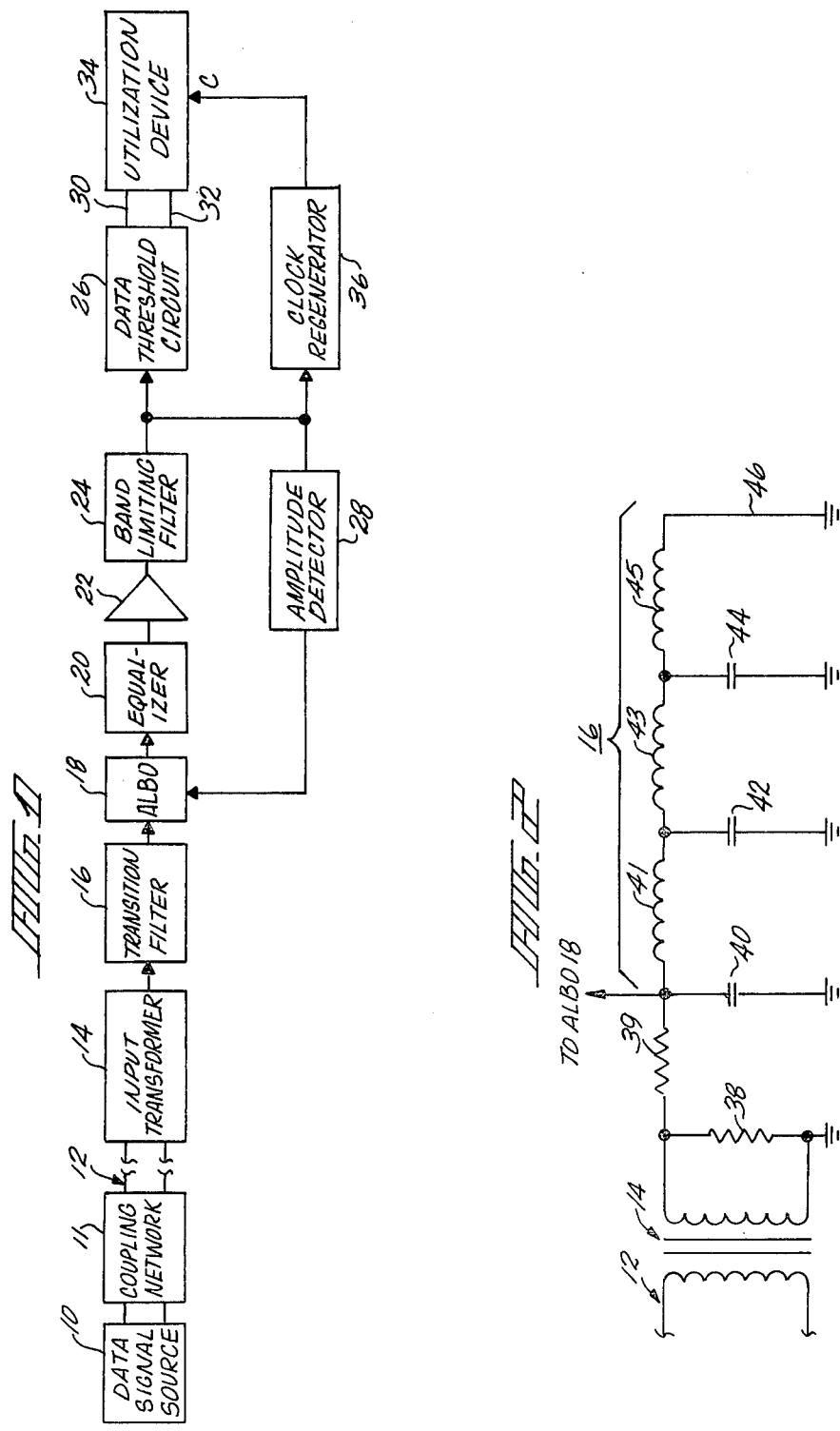

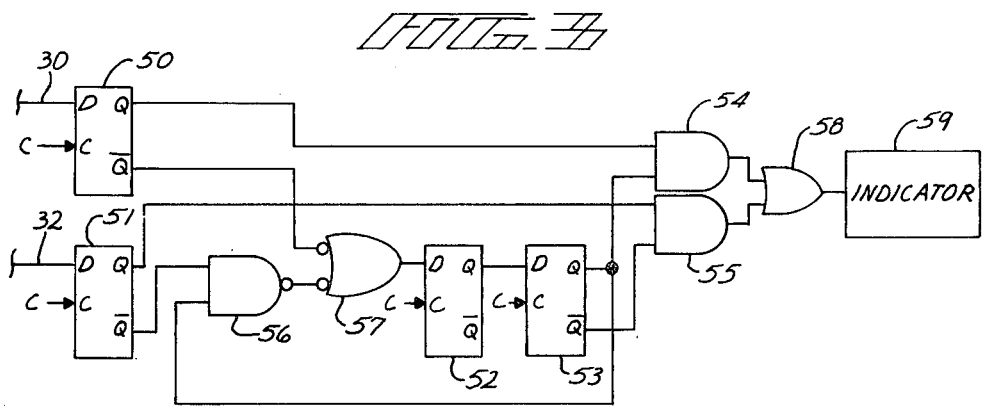
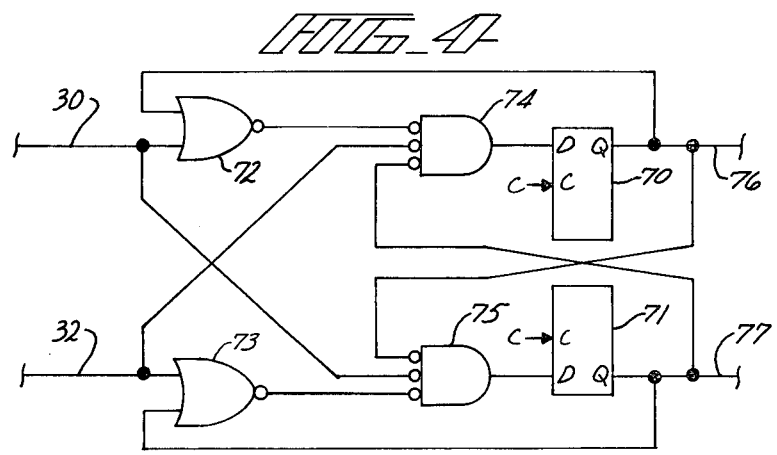
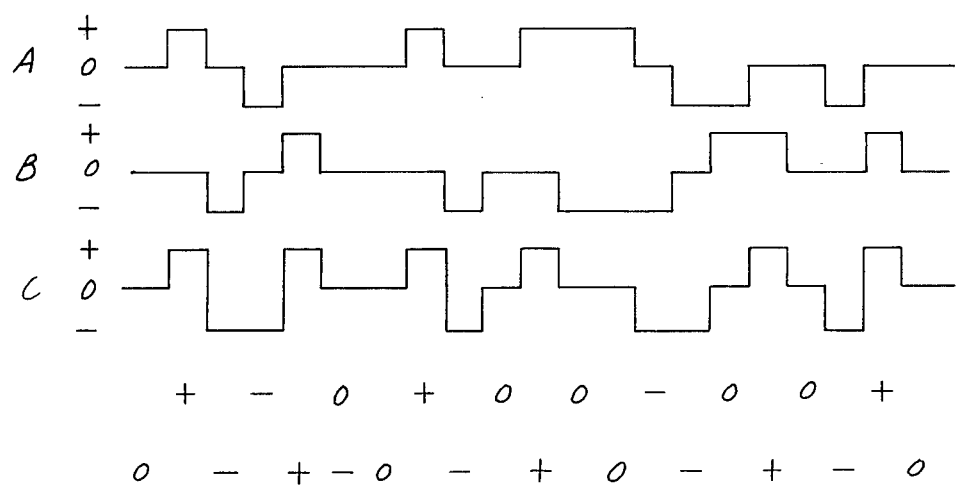

TERNARY DATA TRANSMISSION SYSTEM

BACKGROUND OF THE INVENTION

This invention relates to transmission of data in electrical form, and more particularly, to apparatus for processing and utilizing ternary data after transmission over a telephone line or the like.

The so-called TID digital data transmission system recently went into operation in telephone plants to increase the capacity of large in place single cable and older or small screen cable installations. In this type of system a duobinary code is used to transmit 48 channels of data at a rate of 3.152 megabits per second. The bit time period of the data is thus 0.317 microseconds. As a result of the duobinary code the impairment in transmission quality caused by near end cross talk is reduced, which permits the data carrying capacity to be increased.

In a duobinary code, the data signal has a ternary form. The high and low levels of the data signal represent a first binary value and the intermediate level of the data signal represents a second binary value; the data signal abides by the following encoding rule for determining the high and low levels: it assumes different levels for successive occurrences of the first binary value separated by an odd number of bit time periods and assumes the same level for successive occurrences of the first binary value separated by zero or an even number of bit time periods. The frequency spectrum of the transmitted data signal has maxima at direct current and at the bit rate and a broad null at one half the bit rate. The coupling transformer network at the input to the transmission line has a high pass characteristic that distorts the data signal due to the presence of substantial low frequency energy in the spectrum. As a result, the data signal received at end terminals or repeaters in the system exhibits direct current wander, which must be compensated for.

An article entitled "Quantized Feedback in an Experimental 280-Mb/s Digital Repeater for Coaxial Transmission" by F. D. Waldhauer which appeared in IEEE Transactions on Communications, Volume Com-22 No. 1, January 1974, pages 1 through 5, discloses the use of quantized feedback to compensate for direct current wander. Application of this principle to a duobinary system is disclosed in the conference record of the National Telecommunications Conference, Houston, TX, November–December 1980, Volume 2, Session 39, "TID System Overview." Missing low frequencies are supplied by a filtered signal from the repeater output, which reflects the data or bit pattern over many bit time periods.

SUMMARY OF THE INVENTION

According to the invention, direct current wander of a duobinary data signal is compensated for by subtracting the data signal from a delayed version thereof to derive a ternary change representative signal, which exhibits substantially no direct current wander. The direct current wander is in effect cancelled by the subtraction, while the information content of the data signal is preserved, albeit in a different form. Specifically, a source of a data signal in ternary form has a high level, a low level, and an intermediate level. The high and low levels represent a first binary value, and the intermediate level represents a second binary value. The data signal follows an encoding rule in which the data signal assumes different levels for successive occurrences of the first binary value separated by an odd number of bit time periods and assumes the same level for successive occurrences of the first binary value separated by zero or an even number of bit time periods. The data signal has a bit time period equal to the minimum duration of each level. The data signal source is connected to a remote point by a transmission line. The coupling transformer network at the input to the transmission line has a high pass characteristic. The data signal received at the remote point is subtracted from a delayed version thereof to derive the change representative signal, which is utilized at the remote point to regenerate and/or detect code violations of the data signal. Preferably, the received data signal is subtracted from a version thereof delayed by one bit time period.

A feature of the invention is circuitry for detecting violations of the encoding rule by utilizing the change representative signal. Specifically, an indication of a violation is generated when, after assuming one extreme level, i.e. high or low, in a given bit time period, the change representative signal again assumes the same level before assuming the other extreme level during a bit time period separated by an odd number of bit time periods from the given bit time period.

Another feature of the invention is circuitry for converting the change representative signal back to the duobinary data signal. Specifically, a three-state reversible binary counter is stepped up one state each time the change representative signal assumes its high level, is stepped down one state each time the change representative signal assumes its low level, and remains unchanged in state each time the change representative signal assumes its intermediate level.

BRIEF DESCRIPTION OF THE DRAWINGS

The features of a specific embodiment of the best mode contemplated of carrying out the invention are illustrated in the drawings, in which:

FIG. 1 is a schematic block diagram of a data transmission system incorporating the principles of the invention;

FIG. 2 is a schematic circuit diagram of one embodiment of the transition filter of FIG. 1;

FIG. 3 is a schematic block diagram of one form of the utilization device of FIG. 1, namely, a violation detector;

FIG. 4 is a schematic block diagram of another form of the utilization device of FIG. 1, namely, a duobinary reconverter; and FIG. 5 is a set of wave form diagrams used to explain the invention.

DETAILED DESCRIPTION OF THE SPECIFIC EMBODIMENT

In FIG. 1 a data signal source 10 is connected by a coupling network 11 to the input of a transmission line 12 in the form of a cable comprising a pair of conductors. Typically, coupling network 11 comprises a coupling transformer and a blocking capacitor in series with the transformer primary to prevent transformer saturation. The output of transmission line 12 is connected to an input transformer 14, which is located at a point remote from source 10. As represented by wave form A in FIG. 5, the data signal generated by source 10 has a ternary form, assuming a high level designated "+", a low level designated "−" or an intermediate level designated "0". The data signal has a bit time period, e.g., 0.317 microseconds, equal to the minimum duration of each level. The positive and negative levels represent a first binary value, i.e., a binary "1", and the intermediate level represents a second binary value, i.e., a binary "0". The data signal represents the binary values in a duobinary code. Thus, the data signal follows an encoding rule in which the data signal assumes different levels for successive occurrences of a binary "1" separated by an odd number of bit time periods and assumes the same level for successive occurrences of a binary "1" separated by zero or an even number of bit time periods. The binary value represented by the level during each bit time period in waveform A is shown above such bit time period. As a result of this coding rule, the data signal can only change one level during each bit time period which reduces near end cross talk during data transmission.

Typically, transmission line 12 is a paired telephone cable. Because of the transformers, including coupling network 11 and input transformer 14, in the transmission path between source 10 and the remote point where the data signal is received, the received data signal exhibits direct current wander, i.e., the intermediate level drifts back and forth away from "0" and the high and low levels wander accordingly.

To effectively eliminate direct current wander, the invention provides a transition filter 16, connected to the output of transformer 14. As described in more detail below, filter 16 subtracts the received data signal from a delayed version thereof, and specifically from a version thereof delayed by one bit time period. Thus, filter 16 in effect cancels the direct current wander without destroying the data content of the received signal and the signal at the output of filter 16 represents changes, i.e., transitions, in the received data signal. The change representative signal does not exhibit direct current wander but yet represents the transmitted data. For this reason, the change representative signal is processed, rather than the received data signal.

To this end, an automatic line build out circuit (ALBO) 18, a phase equalizer 20, an amplifier 22, a band limiting filter 24, and a data threshold circuit 26 are connected to transition filter 16 in the order recited. The output of band limiting filter 24 is coupled to ALBO 18 by an amplitude detector 28, which could comprise a full wave rectifier and a filter. As is well known in the art, ALBO 18 controls the amplitude of the signal applied to its input and adjusts the phase equalization responsive to detector 28 to maintain a constant average peak value, equalizer 20 corrects for amplitude and phase distortion that occurs during transmission of the data signal from source 10, and data threshold circuit 26 reestabilishes a three level signal. Filter 24 only transmits the frequency band of the change representative signal, while rejecting higher frequencies. Filter 24 is preferably a low pass filter with a cut off near one half the data rate, e.g. the reciprocal of twice the bit time period. Thus, filter 24 has a cut off frequency that is the reciprocal of four times the delay time period of transition filter 16. Data threshold circuit 26 has outputs 30 and 32 that are connected to a utilization device 34. The three levels generated by data threshold 26 are as follows: a high level at output 30 and a low level at output 32; a high level at output 32 and low level at output 30; and a low level at output 30 and a low level at output 32. The output of band limiting filter 24 is connected by a clock regenerator 36 to utilization device 34 to retime the three level signal applied thereto by data threshold circuit 26, i.e., to reestablish pulses having a duration that is a multiple of the bit time period. Clock regenerator 36 could, for example, comprise a frequency doubler followed by a narrow band crystal filter turned to a frequency that is the reciprocal of the bit time period, e.g., 3.152 megahertz, and pulse shaping circuitry for generating square wave pulses having a 50% duty cycle. ALBO 18, equalizer 20, band limiting filter 24, data threshold circuit 26, amplitude detector 28, and clock regenerator 36 could all be conventional components found in commercial digital telephone carrier systems such as T1, T1C, or T1D.

In FIG. 2, transition filter 16 is shown in detail together with part of transmission line 12 and input transformer 14. A resistor 38 is connected in parallel with the secondary winding of transformer 14 to provide proper line termination impedance. One end of resistor 38 is connected to ground. A resistor 39 and a capacitor 40 are connected in series between the other end of resistor 38 and ground. Transition filter 16 comprises an inductor 41 and a capacitor 42 connected in series from the junction of resistor 39 and capacitor 40 to ground, an inductor 43 and a capacitor 44 connected in series from the junction of an inductor 41 and capacitor 42 to ground, and an inductor 45 connected from the junction of inductor 43 and capacitor 44 to ground by a conductor 46. The junction of resistor 39 and capacitor 40 is connected to ALBO 18 to transmit the change representative signal thereto for processing. The described components function as a delay line having an electrical length equal to one-half of the bit time period and conductor 46 serves as a short circuit at the output of the delay line. Resistor 39 approximately matches the characteristic impedance of filter 16, thereby absorbing reflections therefrom. The received data signal is impressed across capacitor 40, which serves as the input to the delay line. By virtue of the short circuit at the output of the delay line, the received data signal impressed upon the input thereof is reflected back to the input of the delay line in opposite polarity and delayed by one time bit period. Thus, the delay line serves to subtract at its termination (resistor 39) the received data signal from a version thereof delayed by one bit time period and the resultant signal appearing across the input of the delay line is a change representative signal. For the purpose of understanding how the change representative signal is formed, waveform A in FIG. 5 may be regarded as an idealized version of the received data signal. Waveform B may be considered an idealized version of the signal reflected back in the input of the delay line. Waveform C represents an idealized version of the change representative signal, i.e., the arithmetic sum of waveforms A and B. The direct current wander of the received data signal, which is not represented in waveform A, is substantially cancelled by the direct current wander of the reflected signal, which is also not represented in waveform B. From a comparison of waveforms A and C, it can be observed that waveform C is at a "$+$" level in the bit time period immediately following each positive going transition of waveform A, and waveform C is at a "$-$" level during the bit time period immediately following each negative going transition of waveform A. In this sense, waveform C represents the changes, i.e., the transitions, of waveform A.

Utilization device 34 could comprise circuitry for detecting violations of the duobinary encoding rule. A violation in the rule, which implies an error in the transmitted data, occurs when a high or low level of the change representative signal in a given bit time period is followed by the same level before the other level (high or low) during a bit time period separated an odd number of bit time periods from the given bit period. Below waveform C are two rows representing the levels of the change representative signal during alternate bit time periods. As illustrated, in each row the "+" level and the "−" level alternate, the "+" level being followed by a "−" level before another "+" level occurs, and vice versa.

Circuitry for detecting violations of the duobinary encoding rule is shown in FIG. 3. D flip-flops 50, 51, 52 and 53 each have a clock input C connected to the output of clock regenerator 36 (FIG. 1), a data input D, an output Q, and a complementary output $\overline{Q}$. Flip-flops 50 through 53 each produce at their output Q the binary value at their input D after a clock pulse transition appears at input C.

Outputs 30 and 32 of data threshold circuit 26 (FIG. 1) are connected to input D of flip-flops 50 and 51, respectively. Output Q of flip-flop 50 and output Q of flip-flop 53 are connected to the respective inputs of an AND gate 54. Output Q of flip-flop 51 and output $\overline{Q}$ of flip-flop 53 are connected to the respective inputs of an AND gate 55. Output $\overline{Q}$ of flip-flop 51 and output Q of flip-flop 53 are connected to the respective inputs of an NAND gate 56. Output $\overline{Q}$ of flip-flop 50 and the output of NAND gate 56 are connected to the respective inputs of a NAND gate 57. The output of NAND gate 57 is connected to input D of flip-flop 52. Output Q of flip-flop 52 is connected to input D of flip-flop 53. The outputs of AND gates 54 and 55 are connected to the respective inputs of an OR gate 58. The output of OR gate 58 is coupled to an indicator 59.

In operation, the states of flip-flops 50 and 51 represent the polarity, i.e., high or low, of the change representative signal during the current bit time period on a running basis. If the signal is at a high level, output Q of flip-flop 50 is high and output Q of flip-flop 51 is low. If the signal is at a low level, output Q of flip-flop 51 is high and output Q of flip-flop 50 is low. The state of flip-flop 52 represents the polarity of the last non-zero, i.e., extreme, level of the change representative signal in a bit time period spaced by zero or an even number of bit time periods from the current bit time period. If the polarity is high, output Q is high and if the polarity is low, output Q is low. The state of flip-flop 53 represents the polarity of the last non-zero level of the change representative signal in a bit time period spaced by an odd number of bit time periods from the current bit time period. In the terminology used herein this is the given bit time period. If the polarity is low, output Q of flip-flop 51 is high and if the polarity is high, output Q thereof is low. AND gates 54 and 55 compare the polarity of the non-zero level in the current bit time period with the polarity of the last occurring non-zero level in the given bit time period, which is spaced by an odd number of bit time periods from the current bit time period.

When the change representative signal is at zero level in the present bit time period, the states of flip-flops 52 and 53 are circulated, i.e., shifted, by virtue of NAND gate 56 and NAND gate 57. Specifically, the state of flip-flop 52 is transferred to flip-flop 53, and the state of flip-flop 53 is transferred by gates 56 and 57 to flip-flop 52. If output Q of flip-flop 53 is high, the output of NAND gate 56 is low because both inputs are high and the output of NAND gate 57 is high because one of its inputs is low. Thus, the high level of flip-flop 53 is transferred to flip-flop 52. If output Q of flip-flop 53 is low, the output of NAND gate 56 is high because one of its inputs is low, and the output of NAND gate 57 is low because both inputs are high. Thus, the low level of flip-flop 53 is transferred to flip-flop 52.

When the change representative signal is at a high level during the current bit time period, the Q output of flip-flop 52 assumes a high level during the next bit time period, regardless of the state of flip-flop 53 during the current bit time period, because one input of NAND GATE 57 is low, thereby overriding the recirculating state of flip-flop 53.

When the change representative signal is at a low level during the current bit time period, the Q output of flip-flop 52 assumes a low level during the next bit time period, regardless of the state of flip-flop 53 during the current bit time period, because one input of NAND GATE 56 is low.

In summary, at the end of each bit time period of a change representative signal having a high or low level, the representation of that level is transferred from flip-flop 50 or flip-flop 51 to flip-flop 52 and the state of flip-flop 52 is transferred to flip-flop 53. When a high level of the change representative signal in a given bit period is followed by another high level before a low level in a bit time period spaced from the given bit time period by an odd number of bit time periods, the output of AND gate 54 becomes high, thereby generating a code violation signal that is coupled by OR gate 58 to indicator 59. When a low level of the change representative signal in a given bit period is followed by another low level before a high level in a bit time period spaced from the given bit time period an odd number of bit time periods, the output of AND gate 55 becomes high, thereby generating a code violation signal that is coupled by OR gate 58 to indicator 59.

In order to convert the change representative signal, i.e., waveform C in FIG. 5, back to a duobinary data signal, i.e., waveform A in FIG. 5, a three state reversible binary counter is stepped up or down one state, depending upon whether the change representative signal assumes a high level or a low level during each bit time period. When the change representative signal assumes the intermediate level, the state of the counter remains unchanged. Circuitry for performing this function is shown in FIG. 4. D-type flip-flops 70 and 71 serve as the reversible three state counter. Flip-flops 70 and 71 each have an input D, a clock input C to which the output of clock regenerator 36 (FIG. 1) is connected, and an output Q. Outputs 30 and 32 of data threshold circuit 26 (FIG. 1) are connected, respectively, to one input of a NOR gate 72 and a NOR gate 73. Output Q of flip-flop 70 is connected to the other input of NOR gate 72. Output Q of flip-flop 71 is connected to the other input of NOR gate 73. The output of NOR gate 72, output 32, and output Q of flip-flop 71 are connected to the respective inputs of a NOR gate 74. The output of NOR gate 73, output 30, and output Q of flip-flop 70 are connected to the respective inputs of a NOR gate 75. The output of NOR gate 74 is connected to input D of flip-flop 70. The output of NOR gate 75 is connected to input D of flip-flop 71. Output Q of flip-flop 70 and output Q of flip-flop 71 are connected by conductors 76 and 77, respectively, to a buffer and coupling network similar to network 11 for delivery to a transmission line leading to a repeater at a remote point or to an end terminal.

The counter has a lowest state when output Q of flip-flop 71 is high and output Q of flip-flop 70 is low, a middle state when outputs Q of both of flip-flops 70 and 71 are low, and a highest state when output Q of flip-flop 70 is high and output Q of flip-flop 71 is low. The counter steps in one direction, i.e., up from the lowest state to the middle state or from the middle state to the highest state, or steps in the other direction, i.e., down from the highest state to the middle state or from the middle state to the lowest state, depending upon the level of the change representative signal applied to NOR gates 72 and 73 by outputs 30 and 32.

When the change representative signal is at a high level, output 30 is high and output 32 is low. If the counter is then in the lowest state, it steps up to the middle state, i.e., output Q of flip-flop 71 changes from high to low. If the counter is then in the middle state, it steps up to the highest state, i.e., output Q of flip-flop 70 changes from low to high. If the counter is then in the high state, an error condition, the counter remains unchanged until the change representative signal assumes a low level.

When the change representative signal is at a low level, output 32 is high and output 30 is low. If the counter is then in the highest state, it steps down to the middle state, i.e., output Q of flip-flop 70 changes from high to low. If the counter is then in the middle state, it steps down to the lowest state, i.e., output Q of flip-flop 71 changes from low to high. If the counter is then in the low state, an error condition, the counter remains unchanged until the change representative signal assumes a high level. Thus, the counter is self-synchronizing in that it starts counting again in proper relationship with the coded data after the error or errors occur.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, although it is preferable to delay the received data signal by one bit time period, it could be delayed by a fraction of a bit time period, although greater circuit complexity would result. Further, the violation detecting function and the conversion back to duobinary form could be implemented by circuitry different from that disclosed.

What is claimed is:

1. A data transmission system comprising:
   a source of data signal in ternary form having a high level, a low level, and an intermediate level, the data signal having a bit time period equal to the minimum duration of each level; the high and low levels representing a first binary value and the intermediate level representing a second binary value, the data signal following an encoding rule in which the data signal assumes different levels for successive occurrences of the first binary value separated by an odd number of bit time periods and assumes the same level for successive occurrences of the first binary value separated by zero or an even number of bit time periods;
   means having a high pass characteristic for transmitting the data signal to a remote point;
   means at the remote point for receiving the data signal;
   means for deriving a ternary change representative signal equal to the received data signal minus a delayed version thereof; and
   means for controlling the peak amplitude of the change representative signal to maintain a constant average value thereof.

2. The system of claim 1, in which the transmitting means comprises a telephone line and a coupling network.

3. The system of claim 2, in which the telephone line comprises a paired cable.

4. The system of claim 1, in which the subtracting means subtracts the data signal from a version thereof delayed by one bit time period.

5. The system of claim 1, in which the subtracting means comprises a delay line having an input and an output terminated in a short circuit, the received data signal being applied to the input of the delay line and to the utilizing means.

6. The system of claim 5, in which the delay line has an electrical length of approximately one half bit time period or less.

7. The system of claim 1, additionally comprising means for equalizing the controlled change representative signal.

8. The system of claim 2, additionally comprising means for threshold detecting the controlled change representative signal.

9. The system of claim 1, additionally comprising means for converting the controlled change representative signal to the data signal.

10. The system of claim 9, in which the converting means includes means responsive to the change representative signal for deriving clock pulses having a period equal to the bit time period and means responsive to the controlled change representative signal and the clock pulses for generating the data signal with a bit time period equal to the period of the clock pulses.

11. The system of claim 9, in which the converting means comprises a reversible three state binary counter stepping in a first direction from a first to a second to a third state and stepping in a second direction from the third to the second to the first state, means for stepping the counter one state in the first direction when the controlled change representative signal is at its high level and means for stepping the counter one state in the second direction when the controlled change representative signal is at its low level, the state of the counter remaining unchanged when the controlled change representative signal is at its intermediate level.

12. The system of claim 11, in which the binary counter comprises a first flip-flop having a binary output and a second flip-flop having a binary output and the utilizing means additionally comprises a coupling network and a telephone cable having first and second conductors connected to the output of the first flip-flop and the output from the second flip-flop respectively.

13. The system of claim 1, additionally comprising means responsive to the controlled change representative signal for detecting violations in the encoding rule.

14. The system of claim 13, in which the detecting means comprises means for generating an indication when after assuming one extreme level in a given bit time period the controlled change representative signal again assumes the same level before assuming the other extreme level again during a bit time period separated by an odd number of bit time periods from the given bit time period.

15. The system of claim 14, in which the generating means comprises a first storage register for indicating when the change representative signal is currently at its high level, a second storage register for indicating when the change representative signal is currently at its low level, a third storage register for indicating the level, high or low, of the last extreme level of the change representative signal in a bit time period spaced by zero or an even number of bit time periods from the current bit time period, a fourth storage register for indicating the level, high or low, of the last extreme level of the change representative signal in a bit time period spaced by an odd number of bit time periods from the current bit time period, means for transferring the indication of the third register to the fourth register during each bit time period, means for transferring the indication of the fourth register to the third register during bit time periods in which the change representative signal is at its intermediate level, means for transferring to the third register the indication of the first register or the second register during bit time periods when the change representative signal is at an extreme level, and means for comparing the indications of the first and second registers with the indication of the fourth register during each bit time period.

16. A data transmission system comprising:
a source of data signal in ternary form having a high level, a low level, and an intermediate level, the data signal having a bit time period equal to the minimum duration of each level; the high and low levels representing a first binary value and the intermediate level representing a second binary value, the data signal following an encoding rule in which the data signal assumes different levels for successive occurrences of the first binary value separated by an odd number of bit time periods and assumes the same level for successive occurrences of the first binary value separated by zero or an even number of bit time periods;
means having a high pass characteristic for transmitting the data signal to a remote point;
means at the remote point for receiving the data signal;
means for producing a ternary change representative signal equal to the difference of the received data signal subtracted from a delayed version thereof;
means for controlling the peak amplitude of the change representative signal to maintain the change representative signal at a constant average value.

* * * * *